United States Patent [19]

Brandenstein et al.

[11] Patent Number: 4,654,181
[45] Date of Patent: Mar. 31, 1987

[54] METHOD FOR THE MANUFACTURE OF ROLLERS

[75] Inventors: Manfred Brandenstein, Eussenheim; Roland Bonengel, Geldersheim; Herbert Dobhan, Bergrheinfeld, all of Fed. Rep. of Germany

[73] Assignee: SKF Kugellagerfabriken GmbH, Schweinfurt, Fed. Rep. of Germany

[21] Appl. No.: 663,943

[22] Filed: Oct. 23, 1984

[30] Foreign Application Priority Data

Oct. 29, 1983 [DE] Fed. Rep. of Germany ....... 3339356

[51] Int. Cl.$^4$ .......................... B29C 45/43; B29F 1/10
[52] U.S. Cl. ............................ 264/328.12; 264/328.1; 264/328.9
[58] Field of Search .............. 264/328.1, 328.9, 328.12

[56] References Cited

U.S. PATENT DOCUMENTS 3,880,978  4/1975  Apostoleris et al. ........... 264/328.12
4,511,184  4/1985  Schauf et al. .................. 264/328.12

FOREIGN PATENT DOCUMENTS

82/03594 10/1982 PCT Int'l Appl. .

OTHER PUBLICATIONS

Weld-Line Fracture in Molded Parts; Hagerman; Plastics Engineering, Oct. 1973, pp. 67-69.

*Primary Examiner*—Donald Czaja
*Assistant Examiner*—H. Pyon
*Attorney, Agent, or Firm*—Rosen, Dainow & Jacobs

[57] ABSTRACT

A method and apparatus for manufacture of a rolling body directly on a bearing, comprising a hub, a roller sleeve, an annular portion joining the hub and roller sleeve, and reinforcing ribs on either side of the annular portion. Injected material fills the recesses for forming the reinforcing ribs from two directions: a primary flow radially inwardly directed from the mold portion for forming the roller sleeve and a secondary flow radially outwardly directed from the mold portion for forming the hub. The total cross-sectional area of the recesses for forming the reinforcing ribs is adjusted with respect to the circumferential cross-sectional area of the mold portion for forming the annular portion so that the fronts of the primary and secondary flows meet in the recesses. Pressure-release openings are arranged to communicate with the recesses at points in the area at which the meeting of the flow fronts occurs. The junctures resulting from the meeting of the flow fronts are thereby formed along the reinforcing ribs.

6 Claims, 3 Drawing Figures

METHOD FOR THE MANUFACTURE OF ROLLERS

FIELD OF THE INVENTION

The invention relates to a method and apparatus for the manufacture of rollers having reinforcing ribs, by injection molding, wherein as a result of adjustment of the width of the recesses for forming the reinforcing ribs, the junctures formed by the meeting of two streams of injected plastic material are located on the reinforcing ribs, and wherein axially symmetric propagation of the plastic material is ensured by the provision of different-sized pressure-release openings for the differential escape of air from the molding tool.

BACKGROUND OF THE INVENTION

A roller which can be manufactured in accordance with the method of the present invention is shown in FIGS. 1 and 2 of DE-OS No. 3024537. The rolling body comprises a hub mounted on a ball bearing, a roller sleeve, and an annular portion arranged therebetween along the axial center of the rolling body. To increase the load capacity of the roller and to avoid tilting of the roller sleeve as a result of elastic deformation of the annular portion, circumferentially distributed reinforcing ribs are provided on both sides of the annular portion. These stellate, radially directed reinforcing ribs are integrally formed with the roller sleeve and the hub, as well as with the annular portion. When this known roller is manufactured by injection molding, undesirable problems arise with the homogeneity of the material of the finished roller on account of the complex form of the mold. Upon the meeting of two differently directed flows of plastic material, e.g. as a result of flow around a tool portion, a juncture is formed which causes a reduction in strength in that area of the roller and which forms a weak spot in the structure of the roller material. As a result the roller will fail prematurely under high loads or will be suitable for use only under small loads. This is particularly disadvantageous when the juncture is formed in the area of the roller sleeve, because this is the place at which the greatest bending strain is exerted and the area near a juncture is able to withstand only small stresses.

SUMMARY OF THE INVENTION

The object of the invention is to provide a method and a corresponding apparatus for the manufacture of rollers such that the junctures, which are unavoidable in injection molding, are shifted to less dangerous locations.

The object is achieved by distributing the injected plastic material in the molding tool by way of a primary plastic flow of relatively high velocity and a secondary plastic flow of relatively low velocity, whereby the conditions of the flow velocity are regulated so that the reinforcing ribs are formed by the meeting of the radially outwardly directed secondary plastic flow from the hub mold portion and the radially inwardly directed primary flow from the filled roller sleeve mold portion, following filling of the annular mold portion which joins the hub and roller sleeve. The molding tool is designed such that the total cross-sectional area of the recesses for forming the reinforcing ribs is substantially smaller than the cross-sectional area of the mold portion for forming the annular portion of the roller.

The reinforcing ribs serve to support the roller sleeve and consequently are subjected to basically only compressive loads. As a result of the placement of the junctures along the reinforcing ribs, the function of the reinforcing ribs is not impaired and a satisfactory support for the roller sleeve is assured.

In accordance with the method of the invention, the filling of the recesses for formation of the reinforcing ribs takes place from substantially two sides, i.e. radially outwardly from the hub and radially inwardly from the roller sleeve, so that the two plastic flows meet each other in the area of the reinforcing ribs, thereby forming the junctures. This method of injection molding a roller is carried out by the molding tool of the present invention. The decreased cross-sectional area of the slots for forming the reinforcing ribs impedes the secondary flow of plastic therethrough and through the mold portion for forming the hub. Due to the relatively greater cross-sectional area of the mold portion for forming the annular portion, the filling of the latter takes place relatively faster. At the same time, the mold portion for forming the hub is filled and the injected plastic flows radially outwardly in stellate fashion. As a result of this tendency, first the mold portion for forming the hub area is filled, then the area of the annular portion joining the hub and roller sleeve, and thereafter the mold portion for forming the roller sleeve. After filling of the roller sleeve portion, the primary plastic flow flows radially inward into the recesses for forming the reinforcing ribs. This radially inward flow begins before the radially outward flow of the secondary plastic flow from the hub completely fills the recesses. The junctures are formed thereby exclusively in the area of the reinforcing ribs. As a result there are no junctures formed in the loaded roller sleeve, whereby advantageously high loads can be withstood and a long service life is assured. By application of the method of the present invention in combination with the molding tool, a roller with reinforcing ribs is produced wherein the total cross-sectional area of the recesses for forming the reinforcing ribs is substantially smaller than the circumferential cross-sectional area of the mold portion for forming the annular portion which joins the hub and roller sleeve.

In accordance with a further feature of the method of the invention, the flow velocity in the separate molding tool portions is regulated by the respective flow profiles. By proper selection of the profile of the recesses for forming the ribs in relation to the profile of the annular portion which joins the hub and roller sleeve, the relative velocities of the respective plastic flows can be precisely fixed. In this way it is possible to arrange the junctures at any radial location along the reinforcing ribs. The profiles can be designed with the viscosity of the plastic material taken into account.

In accordance with a further feature of the apparatus of the invention, the cross-sectional area of the recesses for forming the reinforcing ribs is proportional to the radial length of the ribs. In the case of an axially symmetrical roller, the reinforcing ribs are uniformly distributed whereby the cross-sectional areas of the recesses are likewise equal. In the case of complex, unsymmetrical injection-molded parts, for example, rollers with eccentric hubs, reinforcing ribs of unequal length can be provided about the circumference. In order to realize the advantages of the invention, it is necessary to individually adjust the cross section of each reinforcing rib in dependence upon its length. Longer reinforcing ribs must be formed with proportionately larger cross sections. In order to ensure a circumferentially uniform action of the roller sleeve under loading, the distribution of reinforcing ribs can be correspondingly adjusted in dependence on the rib cross section. In the area of smaller cross section, for example, more reinforcing ribs can be provided at smaller intervals.

In accordance with another feature of the method of the invention, the flow velocity can be regulated by adjusting the cross section of pressure-release openings formed in the molding tool. During injection of plastic material in the molding tool it is known that air found in the mold must escape by way of pressure-release openings in order to clear the way for plastic material. When relatively small opening cross sections are provided, the pressure-release openings act as throttles and reduce the flow velocity of the plastic material. In this way the propagation of plastic material in the molding tool can be controlled.

In a further preferred embodiment of the molding tool, the pressure-release openings are arranged in the area of the recesses for forming the reinforcing ribs and advantageously on both sides of the molding tool. The pressure-release openings are provided at points in the vicinity of the molding tool where the junctures are formed, since the last remains of unescaped air accumulate at these places, i.e. between the advancing fronts of the primary and secondary flows of plastic material. Consequently, a corresponding pressure-release opening must be provided in the molding tool for each reinforcing rib. Depending on the type of sprue utilized, a preferred direction of flow for the injected plastic material can be specified. In the case of an axial sprue on one side of the roller, the preferred direction is also axial, whereby the plastic material tends to fill the mold areas opposite the sprue side first. By means of adjustment of the cross sections of the pressure-release openings on one side of the roller with respect to those on the other side, advantageously the propagation of plastic material can be uniformly shaped, as a result of which a uniform density and a better surface quality are attained.

BRIEF DESCRIPTION OF THE DRAWINGS

The invention will be described in detail with reference to the following drawings, wherein.

DETAILED DESCRIPTION OF THE PREFERRED EMBODIMENT

Figure 1:
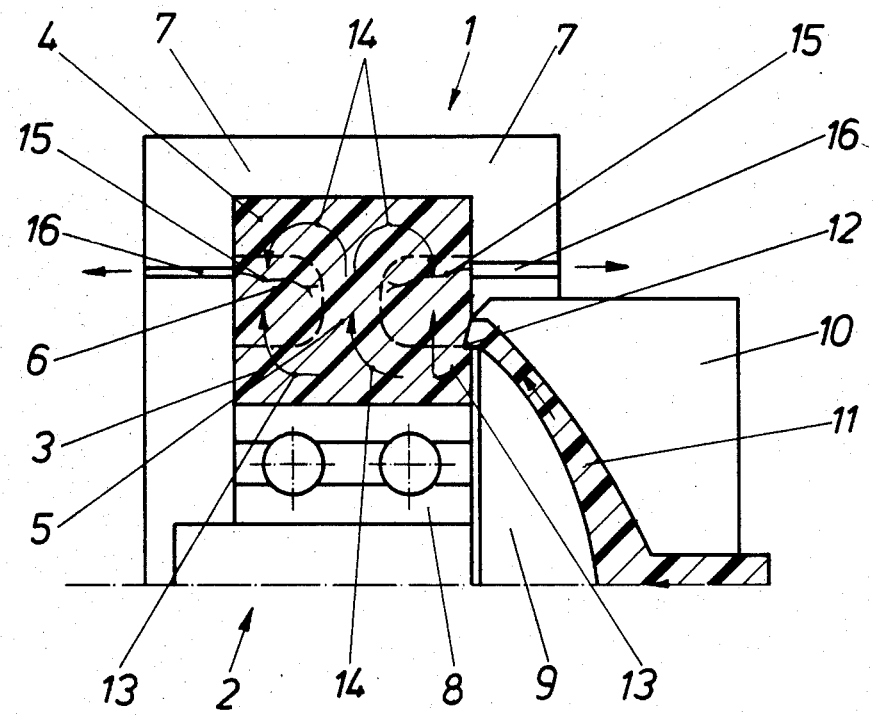
FIG. 1 is a partial longitudinal section of a molding tool with a longitudinal section of the roller taken along line B—B shown in FIG. 2.

FIG. 1 schematically depicts the molding tool, showing only elements essential to the formation of a rolling body 1. The roller essentially comprises a ball bearing 2 and a rolling body 1 injection-molded directly thereon. The rolling body 1 is integrally formed and has a hub 3, a roller sleeve 4, an annular portion 5 arranged in the axial center of the rolling body for joining the hub 3 and roller sleeve 4, and circumferentially distributed, radially directed reinforcing ribs 6 on both axial sides. The construction of the roller is more clearly shown in FIGS. 2 and 3. The molding tool comprises two axially movable, dish-shaped tool parts 7 contiguous at a junction plane located in the axial middle of the roller. The tool part 7 is provided with an annular portion having stellate, radially directed slots for the formation of the reinforcing ribs 6 during injection molding. A mushroom-shaped tool part 9 is inserted in the bore of the inner ring 8 of ball bearing 2, which together with an accessory tool 10 forms the interior space of an umbrella sprue 11. The umbrella sprue 11 ends in an annular sprue channel 12 adjacent the peripheral area of the mushroom-shaped head of tool part 9, through which material is injected into the molding tool until the mold is filled. The arrows in FIG. 1 depict the flow of injected plastic material, which passes through the umbrella sprue 11 and first enters the space corresponding to the hub 3. The stellate, radially directed slots for the formation of the reinforcing ribs have a relatively small transverse section, so that the velocity of the secondary flow 13 of injected plastic material through these slots is greatly reduced as a result of frictional effects. As a result, a relatively unhindered primary flow 14 of injected material travels radially outward through the annular portion 5 into the annular space for formation of the roller sleeve 4. After the annular space for formation of the roller sleeve 4 has been filled, the primary flow reverses direction and flows radially inwardly into the slots for formation of the reinforcing ribs 6 before the slower-moving, radially outwardly directed secondary flow of injected material has entirely filled the slots. The primary flow 14 and secondary flow 13 of injected plastic material meet to form a juncture 15, the location of which is solely determined by compressive forces. At locations corresponding to the locations of the juncture 15 the tool parts 7 are provided with pressure-release openings 16. Because the injected plastic material tends to fill the portion of the molding tool shown on the left-hand side of FIG. 1 first, the pressure-release opening 16 on the left-hand side is formed with a smaller cross-sectional area than the pressure-release opening formed in the right-hand side of the molding tool. As a result a throttling effect is produced whereby the air escapes from the left-hand side of the molding tool at a slower rate than from the right-hand side. The result of this predetermined differential escape of air is that the plastic material propagates in a substantially symmetrical fashion with respect to the axial center of the molding tool.

Figure 2:
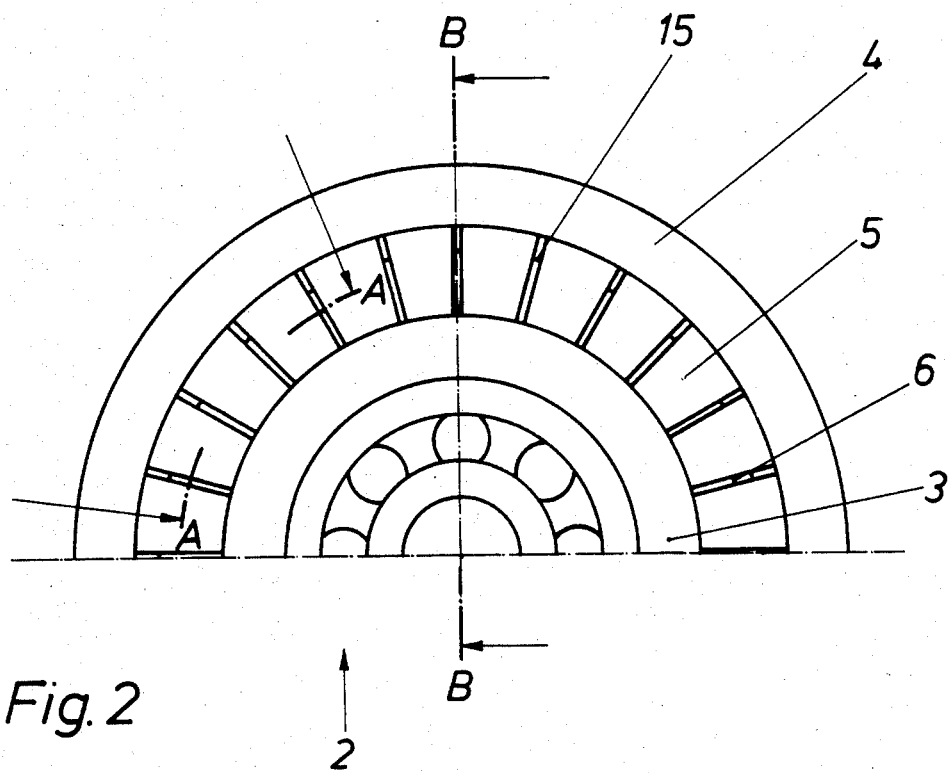
FIG. 2 is a partial side view of a roller manufactured in the molding tool depicted in FIG. 1.

FIG. 2 depicts the equal distribution of the reinforcing ribs 6 about the circumference of the rolling body, with the junctures 15 formed therein.

Figure 3:
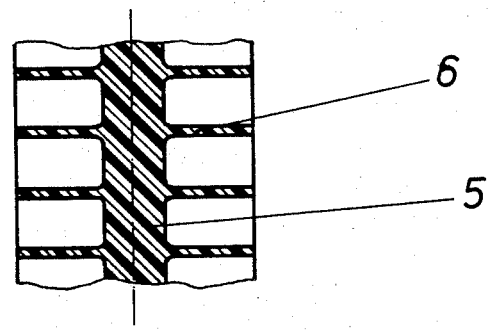
FIG. 3 is a partial circumferential section of the roller taken along arc A—A shown in FIG. 2.

FIG. 3 shows a circumferential section of the rolling body 1 taken along arc A—A of FIG. 1, which cuts through the annular portion 5 and the reinforcing ribs 6 integrally formed therewith.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a method for the manufacture by injection molding of rollers having a hub, a roller sleeve, an annular portion joining said hub and said roller sleeve, and a plurality of substantially stellate, radially directed reinforcing ribs arranged on at least one side of said annular portion and extending between said hub and roller sleeve, wherein material in a heated and flowing condition is injected into an enclosed molding tool provided with pressure-release openings by way of a sprue channel, the improvement comprising the steps of injecting said material into the portion of said molding tool defining said hub by way of an annular sprue channel communicating with a peripheral portion of said hub, directing said injected material from said hub-defining portion of said molding tool in a primary flow of said material of a first velocity into the portion of said molding tool defining said annular portion, then into the portion of said molding tool defining said roller sleeve and thereafter into the portions of said molding tool defining said ribs and in a secondary flow of said injected material of a second velocity lower than said first velocity into said portions of said molding tool defining said ribs, and adjusting said flow velocities such that the primary flow and the secondary flow meet in the recesses between the molding tool portions defining the reinforcing ribs after filling of the molding portions defining said hub, said annular portion, and said roller sleeve.

2. The method recited in claim 1 wherein the flow velocity in the separate molding tool portions is adjusted by changing the flow profile.

3. The method recited in claim 1 wherein the flow velocity is adjusted by changing the profile of said pressure-release openings in said molding tool.

4. The method recited in claim 1 wherein the relative velocities of said primary and secondary flows are adjusted by selecting the width of said recesses between said mold tool portions for defining said reinforcing ribs such that the fronts of said primary and secondary flows meet in said recesses.

5. The method recited in claim 1 wherein said pressure release openings are arranged to communicate with the recesses between the molding tool portions for defining said reinforcing ribs and the relative velocities of said primary and secondary flows are adjusted by selecting the width of the recesses between said molding tool portions for defining said reinforcing ribs such that the fronts of said primary and secondary flows meet in the vicinity of said pressure-release openings.

6. The method recited in claim 1 wherein the flow velocity of the material is regulated by adjusting the cross-sectional area of said pressure-release openings to control the escape of air such that the flow on the side of the molding tool opposite said sprue is inhibited.

* * * * *